(12) United States Patent
Chen

(10) Patent No.: US 10,464,261 B2
(45) Date of Patent: Nov. 5, 2019

(54) DUAL PRINTHEAD ASSEMBLY AND 3D PRINTING APPARATUS USING SAME

(71) Applicant: Teco Image Systems Co., Ltd., Taipei (TW)

(72) Inventor: Ting-Chun Chen, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 267 days.

(21) Appl. No.: 15/784,844

(22) Filed: Oct. 16, 2017

(65) Prior Publication Data

US 2019/0084228 A1 Mar. 21, 2019

(30) Foreign Application Priority Data

Sep. 20, 2017 (TW) .............................. 106132211 A

(51) Int. Cl.
| | |
|---|---|
| *B29C 64/236* | (2017.01) |
| *B29C 64/209* | (2017.01) |
| *B29C 64/295* | (2017.01) |
| *B29C 64/118* | (2017.01) |
| *B33Y 30/00* | (2015.01) |

(52) U.S. Cl.
CPC .......... *B29C 64/236* (2017.08); *B29C 64/209* (2017.08); *B33Y 30/00* (2014.12)

(58) Field of Classification Search
CPC .................................................. B29C 64/209
See application file for complete search history.

(56) References Cited

U.S. PATENT DOCUMENTS

| | | | | |
|---|---|---|---|---|
| 6,109,741 A | * | 8/2000 | Calatayud ............ | B41J 2/17509 347/85 |
| 6,966,711 B2 | * | 11/2005 | Miller ...................... | B41J 13/12 271/274 |
| 8,960,858 B2 | * | 2/2015 | Lutz ......................... | B41J 25/34 347/20 |
| 9,067,424 B1 | * | 6/2015 | Tonninaga ........... | B41J 2/17523 |

FOREIGN PATENT DOCUMENTS

CN 203618652 U * 6/2014

* cited by examiner

*Primary Examiner* — Alison L Hindenlang
*Assistant Examiner* — Jennifer A Kessie
(74) *Attorney, Agent, or Firm* — Kirton McConkie; Evan R. Witt

(57) ABSTRACT

The disclosure relates to a dual printhead assembly and a 3D printing apparatus. The dual printhead assembly includes a base, a printhead module and a switching module. The printhead module includes a positioning swing arm with a bearing disposed at the middle portion thereof, a first printhead unit and a second printhead unit fixed nearby two opposite edges of the bearing, respectively, and a fixing piece passing through the bearing to assemble the printhead module on the base. While a rotation shaft of the switching module is rotated to drive a first cam or a second cam to press an end or another end of an elastic sheet, a third or fourth connecting element disposed on the elastic sheet is driven to press an end or another end of the positioning swing arm, so as to adjust the height difference between the first printhead unit and the second printhead unit.

20 Claims, 17 Drawing Sheets

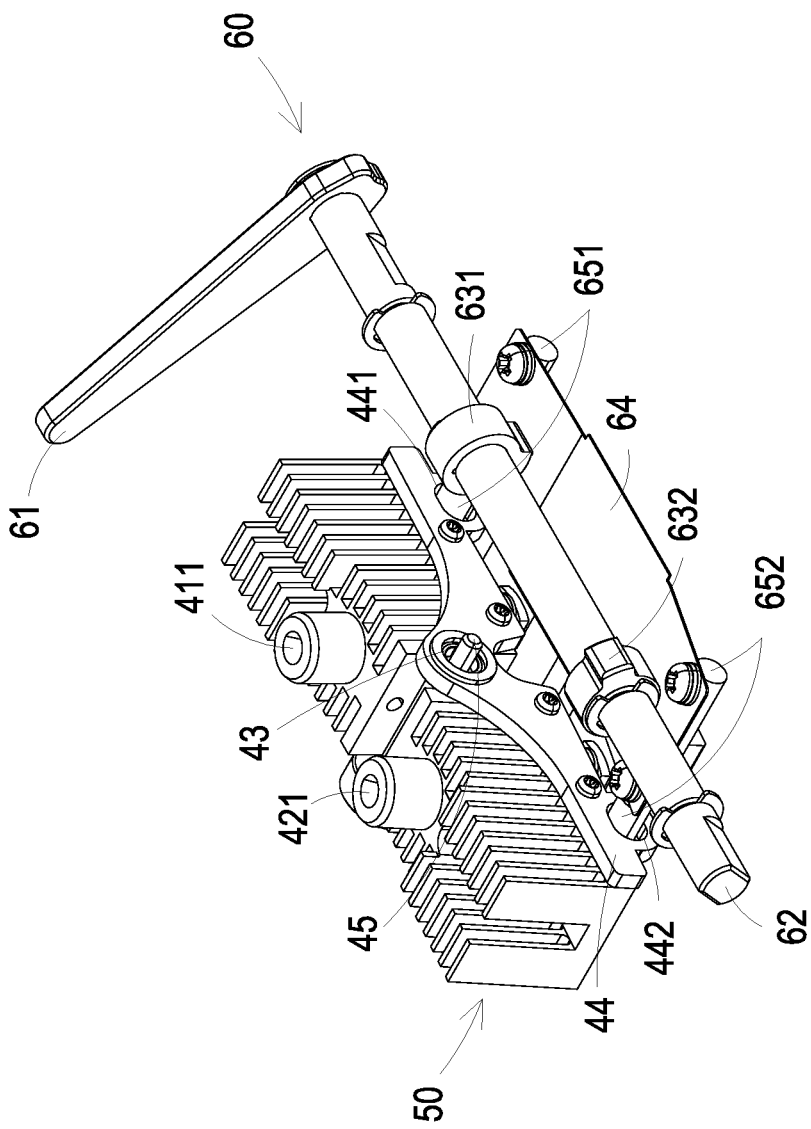

US 10,464,261 B2

DUAL PRINTHEAD ASSEMBLY AND 3D PRINTING APPARATUS USING SAME

FIELD OF THE INVENTION

The present invention relates to a printhead assembly, and more particularly to a dual printhead assembly and a 3D printing apparatus using the same.

BACKGROUND OF THE INVENTION 3D printing, also known as additive manufacturing (AM), refers to processes used to create a three-dimensional object. A large number of additive processes are available in the current market. The main differences between processes are in the way of depositing layers to create parts and in the used materials. Fused deposition modeling (FDM) is an additive manufacturing technology commonly used for modeling, prototyping, and production applications. In Fused deposition modeling (FDM), the model or part is produced by extruding streams of thermoplastic materials, which harden immediately to form layers. A plastic filament or metal wire is unwound from a coil and supplies material to an extrusion nozzle head (3D printer extruder), which heats the material and turns the flow on and off. Stepper motors or servomotors are typically employed to move the extrusion head. Thereby, the required 3D printing model is obtained after performing the 3D printing process.

Although FDM technique is very flexible for producing 3D model or parts, FDM technique still has some restrictions in the variation of shapes that may be fabricated. For example, it is difficult to produce unsupported stalactites, because the extruding material can't be supported by the printed and hardened parts during the printing process.

For overcoming the above restrictions, the FDM apparatus may dispense multiple materials to produce 3D model or parts during the print process. For example, one main material is employed to build up the model and another auxiliary material is employed as a soluble support structure. The auxiliary material of the soluble support structure is different from the main material of the construction model, and the auxiliary material can be removed after the printing program is executed. Thereby, a 3D model or sample constructed solely by the main material is obtained. In addition, a variety of materials in different colors can be employed for melt-deposition by the FDM apparatus. Therefore, in the mainstream market, a dual printhead assembly of the FDM apparatus is employed to handle different materials at the same time gradually.

A conventional dual printhead assembly of the FDM apparatus includes two single printhead sets jointed together simply. There is no rigid body connected between the two single printhead sets to produce mutual action. When the printhead of the dual printhead assembly needs to be replaced, the two single printhead sets must be adjusted to the same height, and the height difference between the two single printhead sets must be much smaller than the minimum thickness of the FDM printing layer. Hence, it is difficult to execute the installation or adjustment for the conventional dual printhead assembly of the FDM apparatus. Further, the mutual heights of the two single printhead sets are unchangeable and always kept in the same plane during the FDM printing. When the printing program is executed, if the nozzle of another non-use single printhead set scratches the working piece, it will lead to print operations failed. In addition, the conventional dual printhead assembly of the FDM apparatus has the two single printhead sets capable of switching to work alternately. The single printhead set, which is switched from the non-use status to the executable statue, needs to be heated, and another single printhead set, which is switched from the executable status to the non-use status, needs to be cooled. Since the hot material easy to overflow from the nozzle of the single printhead set during cooling, it is necessary to move the dual printhead assembly to a waste box for waiting the temperature to cool down and it must take a lot of time.

Therefore, there is a need of providing a dual printhead assembly and a 3D printing apparatus using the same to overcome the above drawbacks.

SUMMARY OF THE INVENTION

An object of the present invention is to provide a dual printhead assembly and a 3D printing apparatus using the same. The dual printhead assembly has the advantages of simple structure and being assembled easily. The dual printhead assembly can be installed and replaced by controlling a single bolt easily, and a mutual height difference of the dual printhead assembly can be adjusted by controlling the rotating cams to drive a positioning swing arm of the dual printhead assembly. Thereby, the assembling process is simplified effectively, the cost is saved and the operational efficiency is improved.

Another object of the present invention is to provide a dual printhead assembly and a 3D printing apparatus using the same. While the dual printhead assembly is driven to move by the driving unit of the 3D printing apparatus automatically, the status of the rotating cams can be controlled to drive the positioning swing arm. Consequently, the positioning swing arm can be swung to adjust the mutual height difference of the dual printhead assembly There is no need to add an extra independent driving source for driving the rotating cams or a height sensing unit for detecting the height difference. Consequently, the operation of the dual printhead assembly for switching the mutual height difference is simplified effectively and the operational efficiency is improved.

A further object of the present invention is to provide a dual printhead assembly and a 3D printing apparatus using the same. While the rotating cams are controlled to drive the positioning swing arm of the dual printhead assembly for adjusting the mutual height difference thereof, the non-use nozzle of the dual printhead assembly can be switched to press against an elastic arm for preventing the cooling materials from overflowing. Consequently, the raw materials waste and the defects on the working piece are avoided. In addition, the nozzle in use can be performed to print continuously, instead of stopping and waiting for completely cooling the materials in the non-use nozzle. The waste of operating time can be reduced effectively, and the operational efficiency of the dual printhead assembly is improved.

An additional object of the present invention is to provide a dual printhead assembly and a 3D printing apparatus using the same. The dual nozzle assembly is driven to move relative to a switch pin set by the driving unit of the 3D printing apparatus so that the dual printhead assembly can accomplish the nozzle switching operation of the dual printhead assembly without using additional driving sources. Not only the cost is saved, but also the operational efficiency of the dual printhead assembly and the 3D printing apparatus is improved.

In accordance with an aspect of the present invention, there is provided a dual printhead assembly including a base, a printhead module, and a switching module. The printhead module includes a first printhead unit, a second printhead unit, a bearing, a positioning swing arm and a fixing piece. The bearing is disposed at a middle portion of the positioning swing arm. The first printhead unit and the second printhead unit are disposed on the positioning swing arm and relative to two opposite edges of the bearing, respectively. The printhead module is fixed to the base by the fixing piece passing through the bearing. The positioning swing arm comprises a first connection element and a second connection element disposed on two ends of the positioning swing arm and located nearby the first printhead unit and the second printhead unit, respectively. The switching module includes a rotation shaft, a first cam, a second cam, an elastic sheet, a third connection element, and a fourth connection element. The elastic sheet is fixed to the base, the third connection element and the fourth connection element are disposed on a first end and a second end of the elastic sheet, respectively. The third connection element is connected to the first connection element and the fourth connection element is connected to the second connection element. The rotation shaft is pivotally connected with the base, and the first cam and the second cam are disposed coaxially on two ends of the rotation shaft and relative to the third connection element and the fourth connection element on the elastic sheet, respectively. While the rotation shaft is rotated to a first position, the second cam is disengaged from the elastic sheet and the first cam presses the first end of the elastic sheet to drive the third connection element to press the first connection element. While the rotation shaft is rotated to a second position, the first cam is disengaged from the elastic sheet and the second cam presses the second end of the elastic sheet to drive the fourth connection element to press the second connection element. Consequently, the positioning swing arm pivoted via the bearing is swung to adjust a mutual height difference between the first printhead unit and the second printhead unit.

In accordance with another aspect of the present invention, there is provided a 3D print apparatus including a frame, a driving unit, a dual printhead assembly, and a switching pin set. The driving unit is constructed on the frame. The dual printhead assembly is constructed on the driving unit and driven by the driving unit for displacement on at least one plane. The dual printhead assembly includes a base printhaed module and a switching module. The printhead module includes a first printhead unit, a second printhead unit, a bearing, a positioning swing arm and a fixing piece, wherein the bearing is disposed at a middle portion of the positioning swing arm. The first printhead unit and the second printhead unit are disposed on the positioning swing arm and located at two opposite edges of the bearing, respectively. The printhead module is fixed to the base by the fixing piece passing through the bearing. The positioning swing arm includes a first connection element and a second connection element disposed on two ends of the positioning swing arm and located nearby the first printhead unit and the second printhead unit, respectively. The switching module includes a rotation shaft, a rotating arm, a first cam, a second cam, an elastic sheet, a third connection element, and a fourth connection element. The elastic sheet is fixed to the base, the third connection element and the fourth connection element are disposed on a first end and a second end of the elastic sheet, respectively. The third connection element is connected to the first connection element and the fourth connection element is connected to the second connection element. The rotation shaft is pivotally connected with the base, the rotating arm is connected to an end of the rotation shaft and the first cam and the second cam are disposed coaxially on two ends of the rotation shaft and relative to the third connection element and the fourth connection element on the elastic sheet, respectively. While the rotation shaft is rotated to a first position, the second cam is disengaged from the elastic sheet and the first cam presses the first end of the elastic sheet to drive the third connection element to press the first connection element. While the rotation shaft is rotated to a second position, the first cam is disengaged from the elastic sheet and the second cam presses the second end of the elastic sheet to drive the fourth connection element to press the second connection element. Thus, the positioning swing arm pivoted via the bearing is swung to adjust a mutual height difference between the first printhead unit and the second printhead unit. The switching pin set is disposed on an edge of the frame. While the dual printhead assembly is driven by the driving unit to move along a first path, the rotating arm is pushed against by the switching pin set and the rotation shaft is rotated to the first position. While the dual printhead assembly is driven by the driving unit to move along a second path, the rotating arm is pushed against by the switching pin set and the rotation shaft is rotated to the second position.

The above contents of the present invention will become more readily apparent to those ordinarily skilled in the art after reviewing the following detailed description and accompanying drawings, in which:

BRIEF DESCRIPTION OF THE DRAWINGS

FIG. 5B is another perspective view illustrating the printhead module and the switching module of FIG. 5A;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
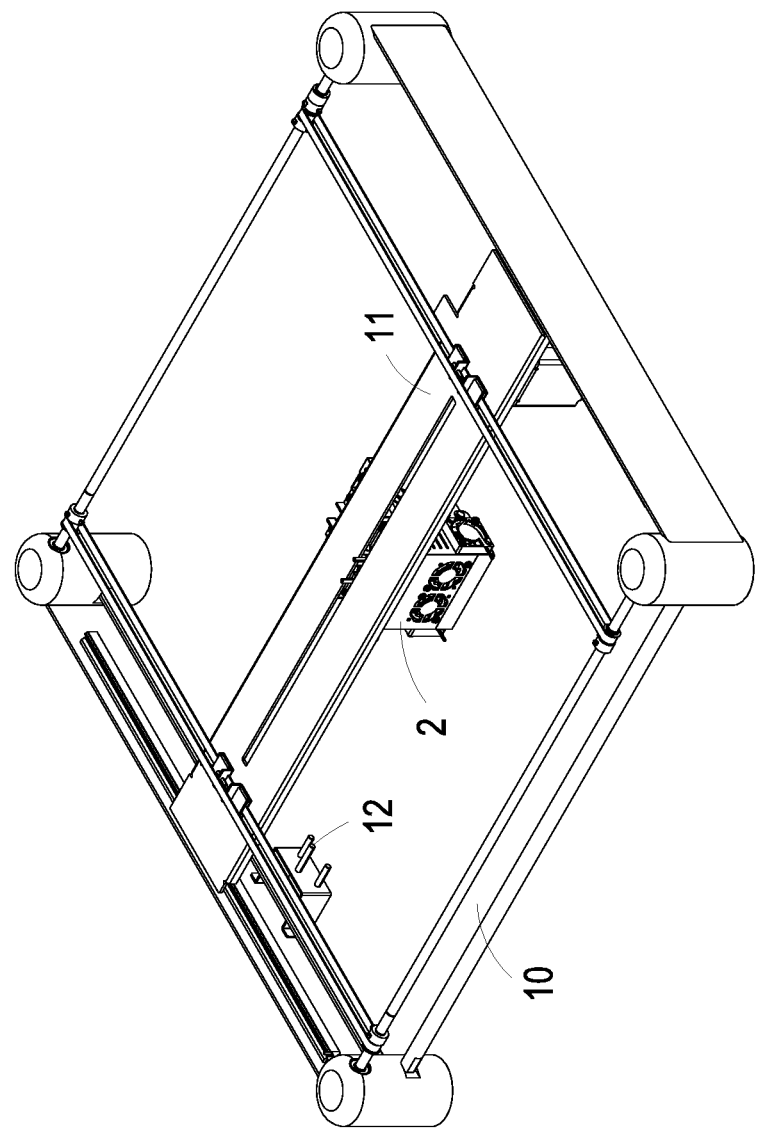
FIG. 1 is a perspective view illustrating a 3D printing apparatus according to a preferred embodiment of the present invention.
Figure 2:
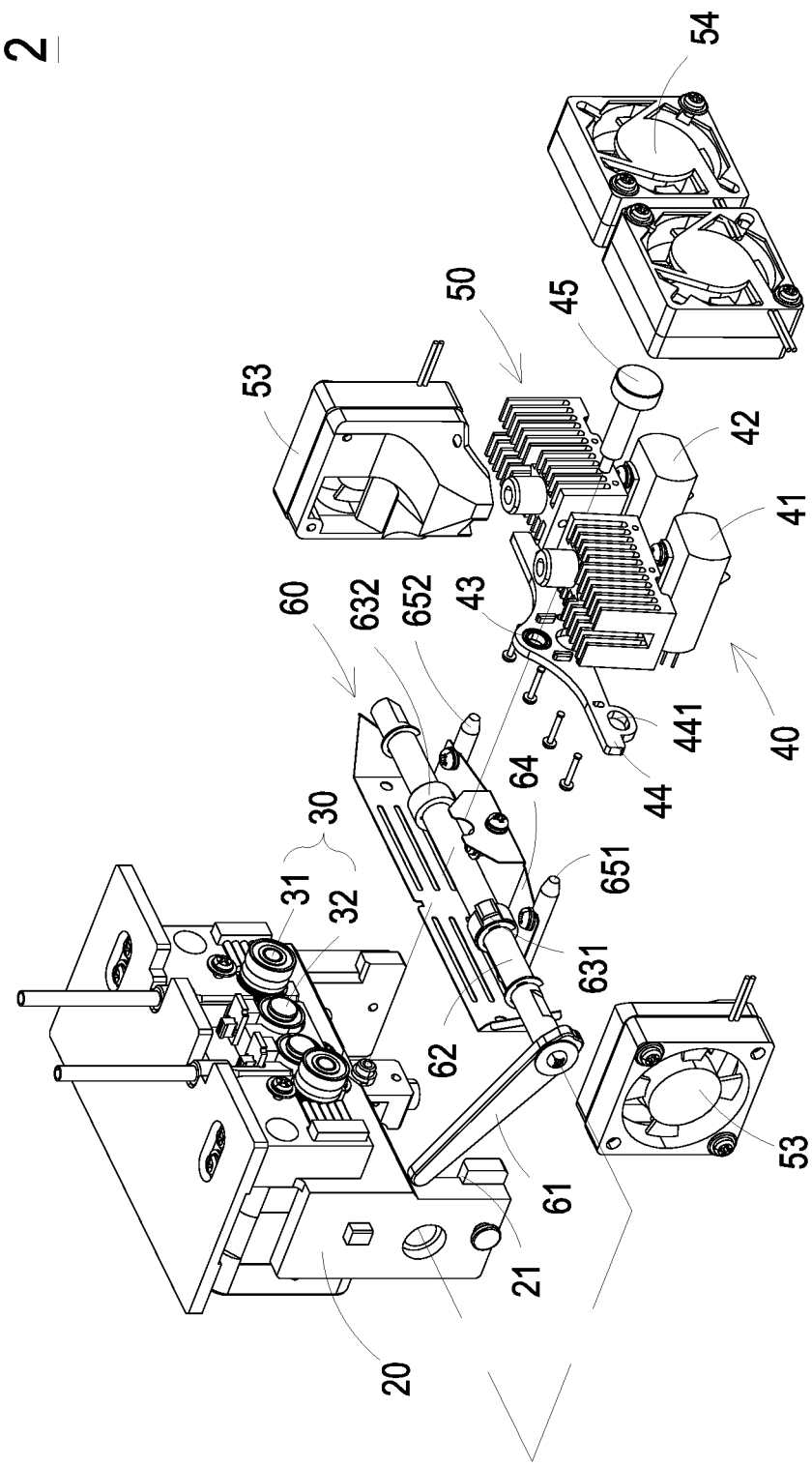
FIG. 2 is an exploded view illustrating a dual printhead assembly according to a first preferred embodiment of the present invention.
Figure 3:
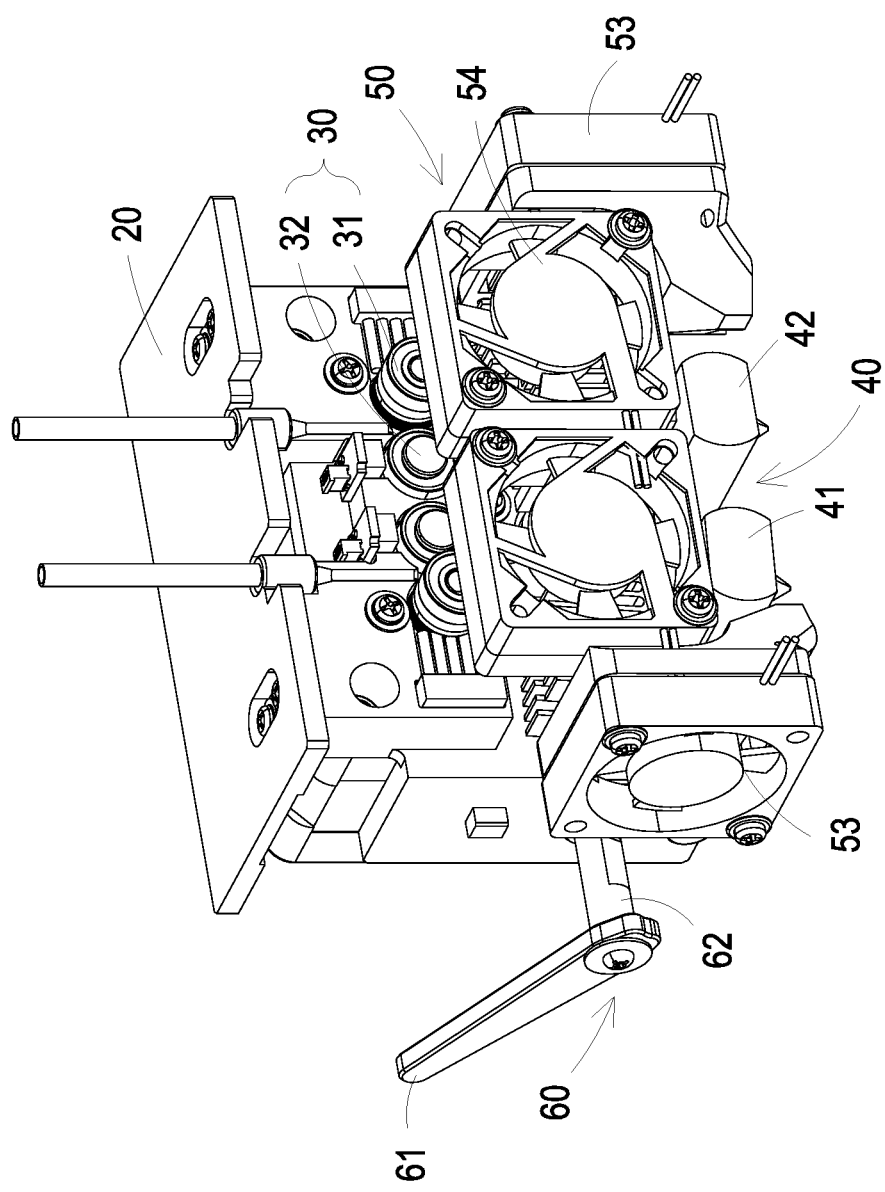
FIG. 3 is a perspective view illustrating the dual printhead assembly of FIG. 2.

FIG. 1 is a perspective view illustrating a 3D printing apparatus according to a preferred embodiment of the present invention. The 3D printing apparatus 1 includes a frame 10, a driving unit 11, a switching pin set 12 and a dual printhead assembly 2. The switching pin set 12 is disposed on an edge of the frame 10. The driving unit 11 is constructed on the frame 10. The dual printhead assembly 2 is constructed on the driving unit 11 and driven by the driving unit 11 to move to a specific working position in the frame 10 for executing a 3D printing process or an adjustment process. FIG. 2 is an exploded view illustrating a dual printhead assembly according to a first preferred embodiment of the present invention. FIG. 3 is a perspective view illustrating a dual printhead assembly of FIG. 2. As shown in FIGS. 2 and 3, the dual printhead assembly 2 includes a base 20, a feeding module 30, a printhead module 40, a heat dissipation module 50 and a switching module 60. In the embodiment, the feeding module 30 includes at least two active feeding wheels 31 and at least two passive feeding wheels 32 disposed on one side of the base 20. The distance between the centers of each active feed wheels 31 and the corresponding passive feeding wheel 32 is fixed. For feeding the printing materials, the active feeding wheel 31 generates a normal force to compress the linear printing materials together with the corresponding passive feeding wheel 32. When the active feed wheel 31 is rotated, a frictional force can be generated between the active feed wheels 31 and the corresponding passive feeding wheel 32 to drive the linear printing materials to the printhead module 40. However, the feeding method of the feeding module 30 is not an essential limitation to the present invention, and not redundantly described herein.

Figure 4:
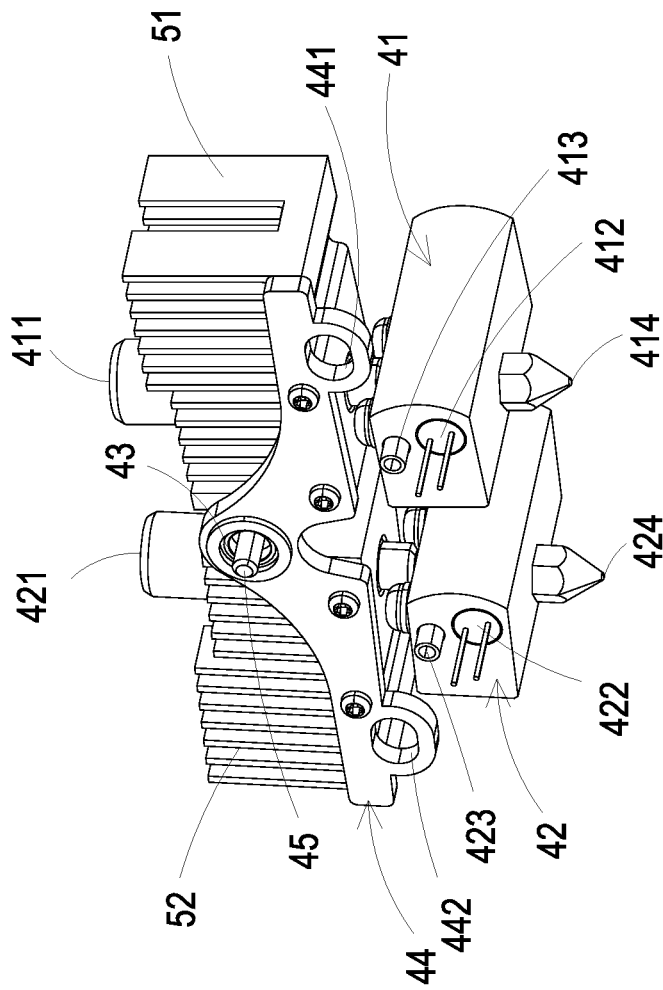
FIG. 4 is a perspective view illustrating the printhead module of FIG. 2.

In the embodiment, the printhead module 40 includes a first printhead unit 41, a second printhead unit 42, a bearing 43, a positioning swing arm 44 and a fixing piece 45. Preferably but not exclusively, the bearing 43 is a ball bearing and disposed at the middle of the positioning swing arm 44. The first printhead unit 41 and the second printhead unit 42 are disposed on the positioning swing arm 44 via the heat dissipation module 50 and relative to two opposite edges of the bearing 43, respectively. The fixing piece 45 is located between the first printhead unit 41 and the second printhead unit 42 and passes through the bearing 43 to connect the printhead module 40 with the base 20. While the printhead module 40 is connected to the base 20, the positioning swing arm 44 can swing relative to the base 20 via the bearing 43 so as to adjust the mutual height difference between the first printhead unit 41 and the second printhead unit 42. FIG. 4 is a perspective view illustrating the printhead module of FIG. 2. As shown in FIGS. 2 to 4, the first printhead unit 41 includes a feeding port 411, a heating tube 412, a temperature sensor 413 and a nozzle 414 disposed thereon. The second printhead unit 42 includes a feeding port 421, a heating tube 422, a temperature sensor 423 and a nozzle 424. On the other hand, the heat dissipation module 50 includes a first heat sink 51 and a second heat sink 52. In the embodiment, the first heat sink 51 and the second heat sink 52 are fixed on the same side of the positioning swing arm 44 by for example but not limited to screws or bolts, and located nearby the two opposite edges of the bearing, respectively. The first printhead unit 41 passes through the first heat sink 51 and the second printhead unit 42 passes through the second heat sink 52 so that the first printhead unit 41 and the second printhead unit 42 are fixed on the same side of the positioning swing arm 44 and relative to the two opposite edges of the bearing 43, respectively. In the embodiment, the positioning swing arm 44 further includes a first connection element 441 and a second connection element 442 disposed on two ends of the positioning swing arm 44 and relative to the first printhead unit 41 and the second printhead unit 42, respectively. Preferably but not exclusively, the first connection element 441 and the second connection element 442 is a first positioning hole and a second positioning hole. The distance from the first connecting member 441 to the bearing 43 is the same as the distance from the second connecting member 442 to the bearing 43. Similarly, the distance from the nozzle 414 of the first printhead unit 41 to the bearing 43 is the same as the distance from the nozzle 424 of the second printhead unit 42 to the bearing 43. It is noted that the dual printhead assembly 2 has the printhead module 40 capable of being installed on the base 20 by the fixing piece 45 passing through the bearing 43 on the positioning swing arm 44. Alternatively, the printhead module 40 can be uninstalled easily by removing the fixing piece 45 from the base 20. Consequently, the installation and the maintenance of the printhead module 40 are simplified effectively. Preferably but not exclusively, the fixing piece 45 is a fixing screw or a fixing bolt. In the embodiment, the heat dissipation module 50 further includes a first cooling fan set 53 and a second cooling fan set 54. The first cooling fan set 53 and the second cooling fan set 54 can be for example but not limited to a blower, an axial cooling fan or a cooling fan having a diversion nozzle. The first cooling fan set 53 and the second cooling fan set 54 are disposed at both laterals and the front side of the printhead module 40, respectively, so as to effectively dissipate the heat generated by the printhead module 40 during executing the 3D printing.

Further in the embodiment, the switching module 60 is constructed on the base 20 and includes a rotating arm 61, a rotation shaft 62, a first cam 631, a second cam 632, an elastic sheet 64, a third connection element 651, and a fourth connection element 652. The rotation shaft 62 is pivotally connected with the base 20. The rotating arm 61 is connected to an end of the rotation shaft 62 and configured to control the rotation of the rotation shaft 62. The elastic sheet 64 is fixed to the base 20. The third connection element 651 and the fourth connection element 652 are disposed on two ends of the elastic sheet 64, respectively. While the printhead module 40 is installed on the base 20 by the fixing piece 45 passing through the bearing 43 on the positioning swing arm 44, the third connection element 651 is connected to the first connection element 441 and the fourth connection element 652 is connected to the second connection element 442. Preferably but not exclusively, in the embodiment, the third connection element 651 and the fourth connection element 652 are a first positioning pin and a second positioning pin, respectively. Thus, the end of the first positioning pin and the end of the second positioning pin can be aligned and inserted into the first positioning hole and the second positioning hole of the positioning swing arm 44, respectively. In the embodiment, the first cam 631 and the second cam 632 are disposed coaxially on two ends of the rotation shaft 62 and relative to the third connection element 651 and the fourth connection element 652 on the elastic sheet 64, respectively. While the rotating arm 61 drives the rotation shaft 62 to rotate to a first position, the second cam 632 is disengaged from the elastic sheet 64 and the first cam 631 presses the end of the elastic sheet 64 to drive the third connection element 651 to press the first connection element 441. Consequently, the positioning swing arm 44 is driven to swing in a direction relative to the base 20 via the bearing 43 so as to adjust the mutual height difference between the nozzle 414 of the first printhead unit 41 and the nozzle 424 of the second printhead unit 42. The height level of the nozzle 424 of the second printhead unit 42 is higher than that of the nozzle 414 of the first printhead unit 41. Alternatively, while the rotating arm 61 drives the rotation shaft 62 to rotate to a second position, the first cam 631 is disengaged from the elastic sheet 64 and the second cam 632 presses another end of the elastic sheet 64 to drive the fourth connection element 652 to press the second connection element 442. Thus, the positioning swing arm 44 is driven to swing in a reversed direction relative to the base 20 via the bearing 43 so as to adjust the mutual height difference between the nozzle 424 of the second printhead unit 42 and the nozzle 414 of the first printhead unit 41. The height level of the nozzle 414 of the first printhead unit 41 is higher than that of the nozzle 424 of the second printhead unit 42. Consequently, the adjustment of the mutual height difference between the nozzle 414 of the first printhead unit 41 and the nozzle 424 of the second printhead unit 42 is accomplished.

Figure 5A:
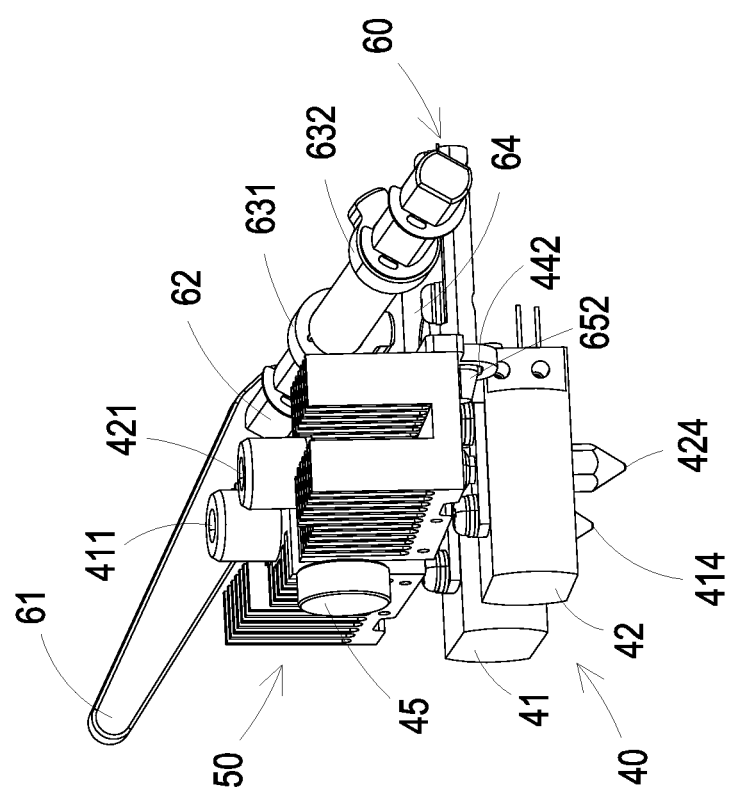
FIG. 5A is a perspective view illustrating the printhead module and the switching module while the rotating arm and the rotation shaft are rotated to the first position.
Figure 5C:
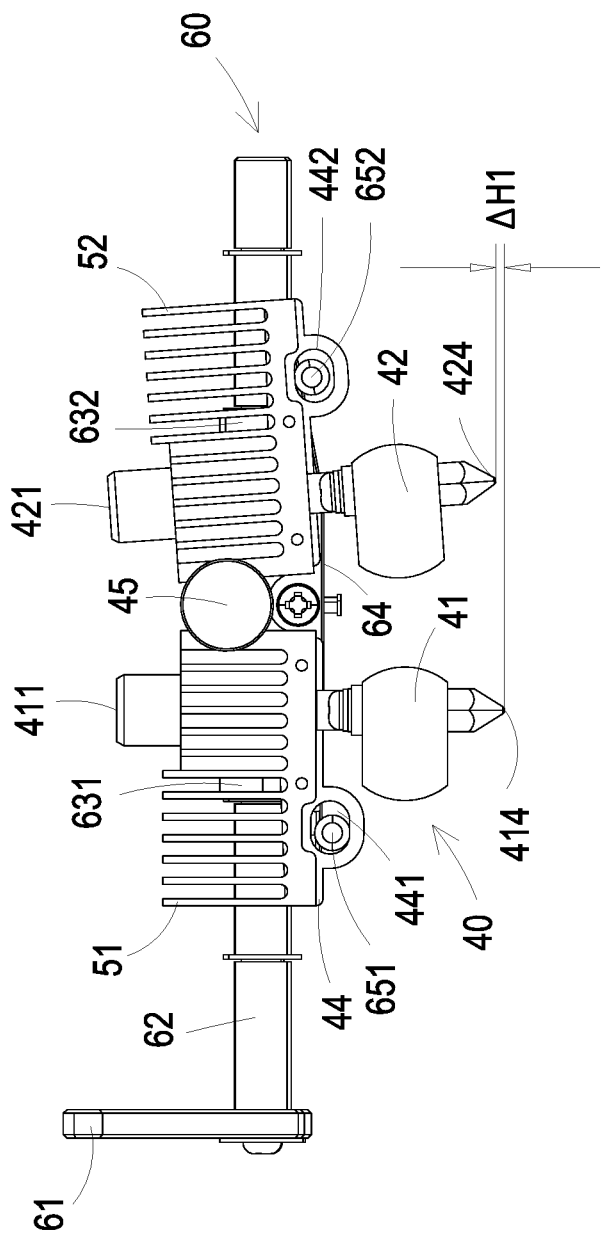
FIG. 5C is a front view illustrating the printhead module and the switching module of FIG. 5A.

FIG. 5A is a perspective view illustrating the printhead module and the switching module while the rotating arm and the rotation shaft are rotated to the first position. FIG. 5B is another perspective view illustrating the printhead module and the switching module of FIG. 5A. FIG. 5C is a front view illustrating the printhead module and the switching module of FIG. 5A. As shown in FIGS. 5A to 5C, while the rotating arm 61 drives the rotation shaft 62 to rotate to the first position, the first cam 631 on the end of the rotation shaft 62 presses the end of the elastic sheet 64, but the second cam 632 on another end of rotation shaft 62 is disengaged from the elastic sheet 64. Consequently, the third connection element 651 is driven by the end of the elastic sheet 64 to press the first connection element 441 and the positioning swing arm 44 is swung via the bearing 43. The nozzle 414 of the first printhead unit 41 is moved downward and generates a height difference ΔH1 from the nozzle 424 of the second printhead unit 42. Under this circumstance, the first printhead unit 41 is vertical to the working plane for executing 3D printing. The second printhead unit 42 is inclined and the height level of the nozzle 424 of the second printhead unit 42 is higher than the nozzle 414 of the first printhead unit 41 on the working plane. Consequently, the 3D printing process executed by the first printhead unit 41 on the work plane is not affected by the second printhead unit 42.

Figure 6A:
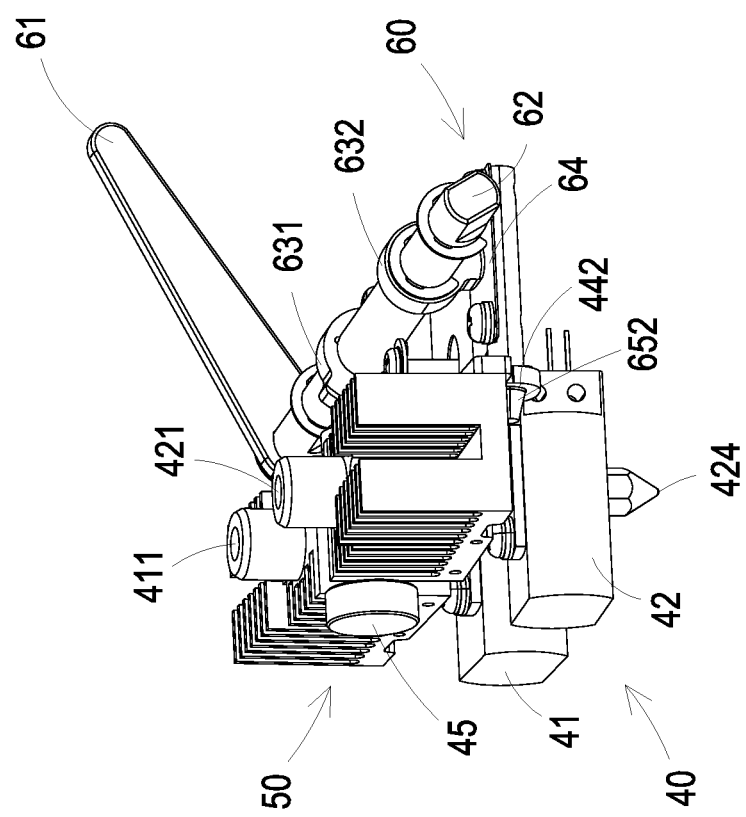
FIG. 6A is a perspective view illustrating the printhead module and the switching module while the rotating arm and the rotation shaft are rotated to the second position.
Figure 6B:
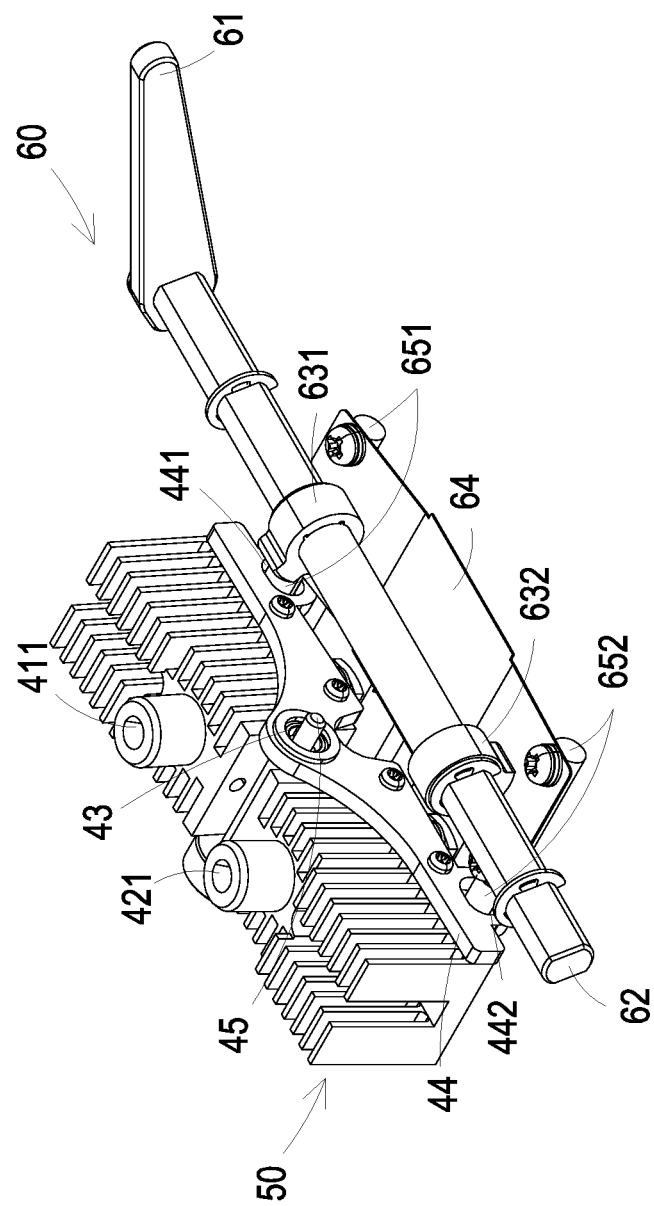
FIG. 6B is another perspective view illustrating the printhead module and the switching module of FIG. 6A.
Figure 6C:
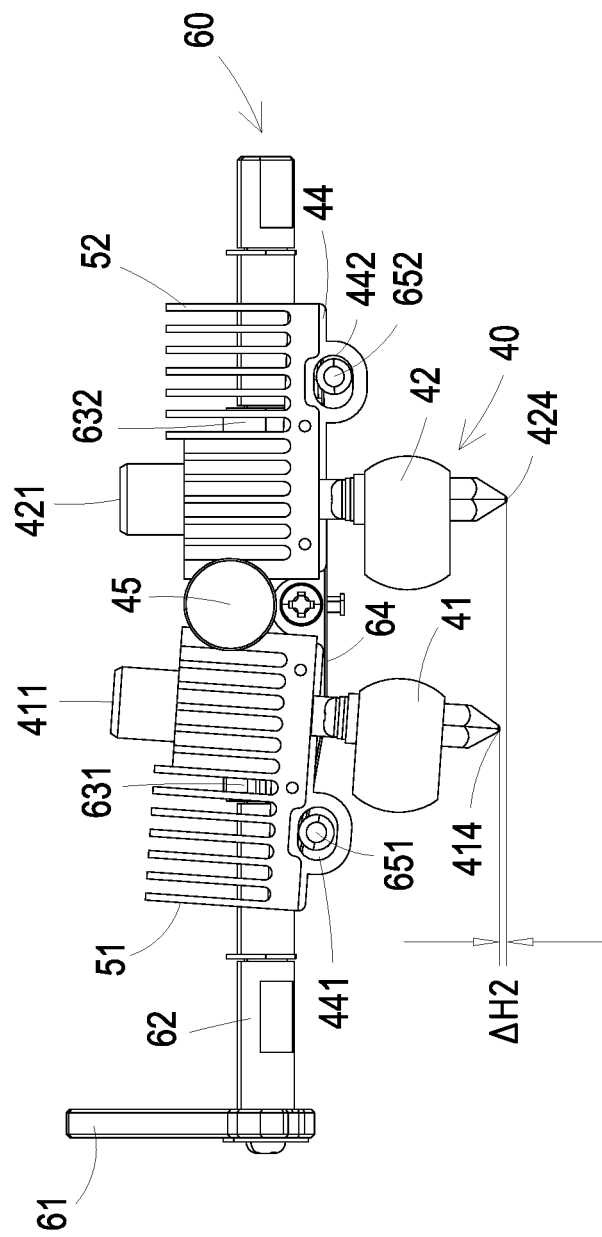
FIG. 6C is a front view illustrating the printhead module and the switching module of FIG. 6A.

FIG. 6A is a perspective view illustrating the printhead module and the switching module while the rotating arm and the rotation shaft are rotated to the second position. FIG. 6B is another perspective view illustrating the printhead module and the switching module of FIG. 6A. FIG. 6C is a front view illustrating the printhead module and the switching module of FIG. 6A. As shown in FIGS. 6A to 6C, while the rotating arm 61 drives the rotation shaft 62 to rotate to the second position, the first cam 631 on the end of the rotation shaft 62 is disengaged from the elastic sheet 61 and the second cam 632 on another end of the rotation shaft 62 presses another end of the elastic sheet 64. Thus, the fourth connection element 652 is driven by another end of the elastic sheet 64 to press the second connection element 442 and the positioning swing arm 44 is swung reversely via the bearing 43. The nozzle 424 of the second printhead unit 42 is moved downward and generates a height difference ΔH2 from the nozzle 414 of the first printhead unit 41. Under this circumstance, the second printhead unit 42 is vertical to the working plane for executing 3D printing. The first printhead unit 41 is inclined and the height level of the nozzle 414 of the first printhead unit 42 is higher than the nozzle 424 of the second printhead unit 42 on the working plane. Consequently, the 3D printing process executed by the second printhead unit 42 on the work plane is not affected by the first printhead unit 41.

In an embodiment, the switching module 60 of the dual printhead assembly 2 executes the switching process by rotating the positions of the rotating arm 61. Under this circumstance, the first cam 631 or the second cam 632 on the rotation shaft 62 is rotated to press against the elastic sheet 64 and further drives the third connecting element 651 to press the first connection element 441 or the fourth connecting element 652 to press the second connection element 442, so as to swing the positioning swing arm 44. In the embodiment, the base 20 further includes two stoppers 21 disposed nearby two laterals of the base 20 and located under the two ends of the positioning swing arm 44, respectively, so as to limit the downward swing regions of the two ends of the positioning swing arm 44 while one of the two ends of the positioning swing arm 44 is swung to press thereat. Moreover, while the third connecting element 651 is pressed against the first connecting element 441 or the fourth connecting element 652 is pressed against the second connecting element 442, it facilitates to ensure the first printhead unit 41 or the second printhead unit 42 is indeed vertically oriented to the working plane and the 3D printing process is executed correctly. It is emphasized that the angle, the position, the moving direction, the moving sequence and the driving method of the rotation shaft 62 controlled by rotating the rotating arm 61, the first cam 631 and the second cam 632 are adjustable according to the practical requirements.

In the embodiment, the driving unit 11 and the switching pin set 12 of the 3D printing apparatus 1 are employed for the switching module 60 of the dual printhead assembly 2 to achieve the automatically switching of the first printhead unit 41 and the second printhead unit 42. Since the dual printhead assembly 2 is constructed on the driving unit 11, the driving unit 11 is constructed on the frame 10 and the switching pin set 12 is disposed on the edge of the frame 10, the dual printhead assembly 2 can be driven by the driving unit 11 and moved relative to the switching pin set 12. Thus, the rotating arm 61 can be pushed against to rotate the rotation shaft 62 and execute the above switching operation between the first position and the second position. There is no need to add an extra independent driving source on the dual printhead assembly 2.

Figure 7A:
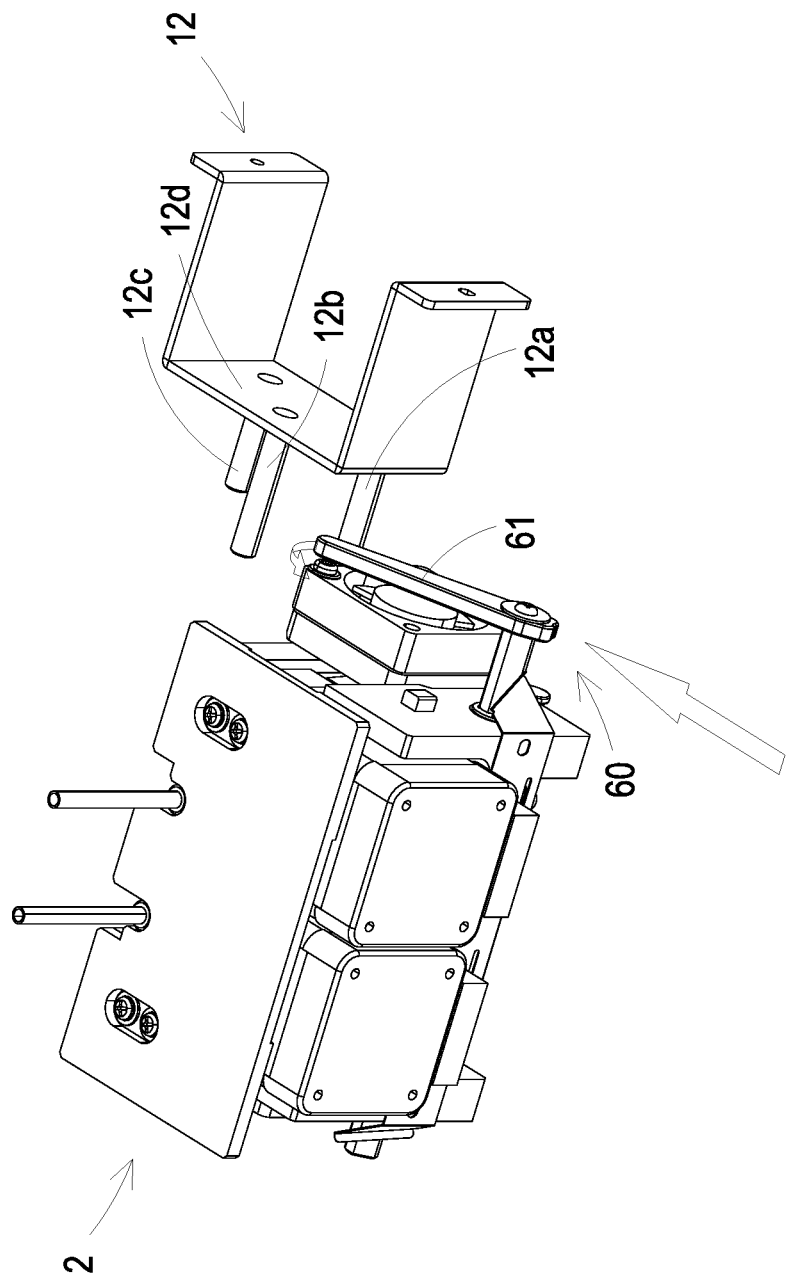
FIG. 7A illustrates the rotating arm of the switching module driven to switch from the first position to the second position at the first stage according to the first preferred embodiment of the present invention.
Figure 7B:
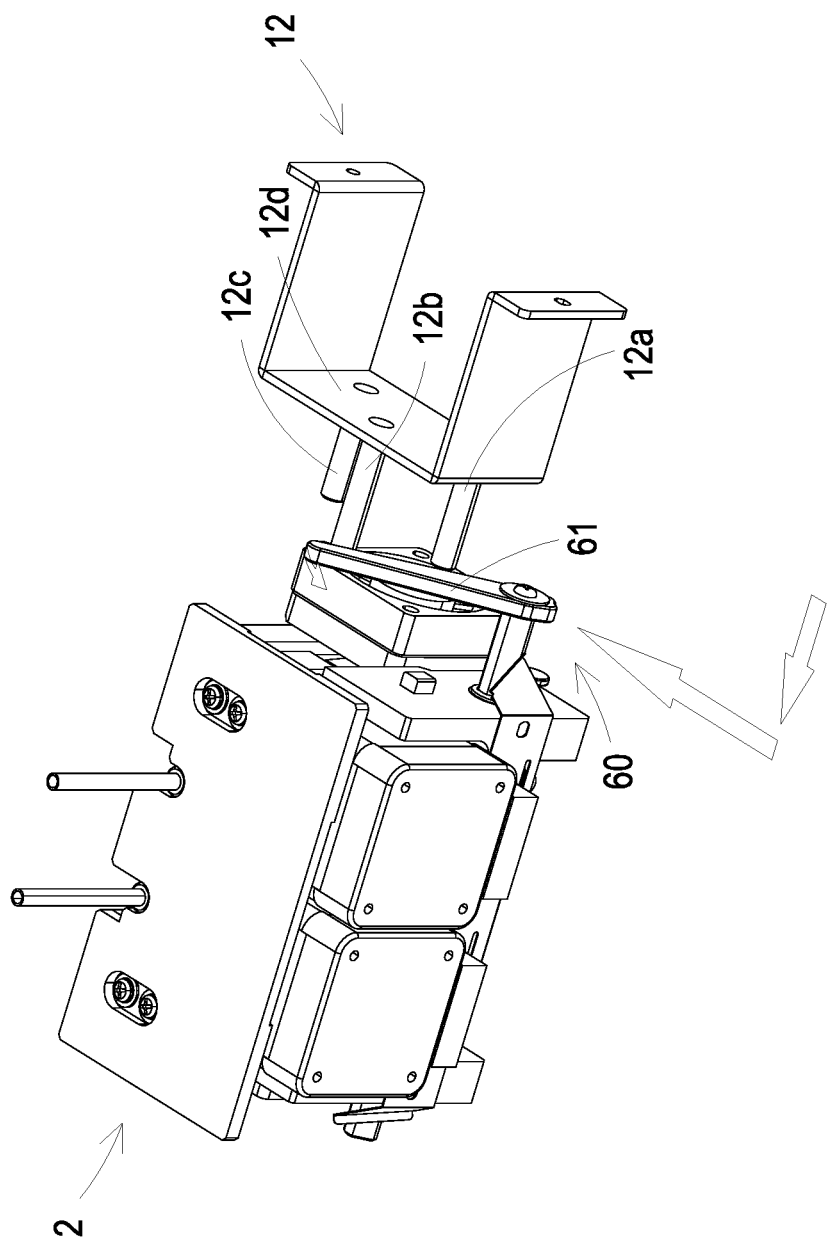
FIG. 7B illustrates the rotating arm of the switching module driven to switch from the first position to the second position at the second stage according to the first preferred embodiment of the present invention.
Figure 7C:
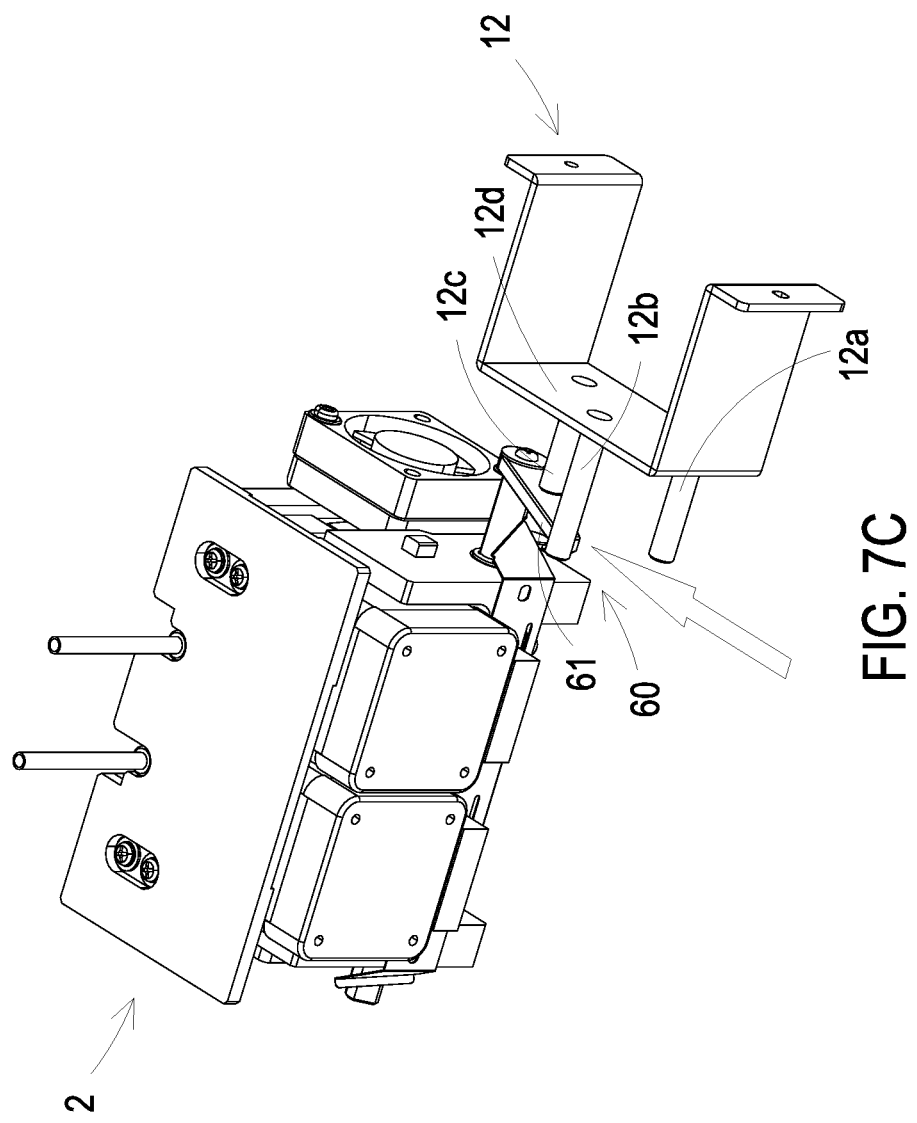
FIG. 7C illustrates the rotating arm of the switching module driven to switch from the first position to the second position at the third stage according to the first preferred embodiment of the present invention.

FIG. 7A illustrates the rotating arm of the switching module driven to switch from the first position to the second position at the first stage according to the first preferred embodiment of the present invention. FIG. 7B illustrates the rotating arm of the switching module driven to switch from the first position to the second position at the second stage according to the first preferred embodiment of the present invention. FIG. 7C illustrates the rotating arm of the switching module driven to switch from the first position to the second position at the third stage according to the first preferred embodiment of the present invention. While the rotating arm 61 of the switching module 60 is switched from the first position to the second position, the driving unit 11 (as shown in FIG. 1) drives the dual printhead assembly 2 to move along a first horizontal displacement path relative to the switching pin set 12 and the position switching of the rotating arm 61 is accomplished. Namely, the executable status of the first printhead unit 41 in FIGS. 5A to 5C is switched to the executable status of the second printhead unit 42 in FIGS. 6A to 6C. In the embodiment, the switching pin set 12 includes a first pin 12a, a second pin 12b, a third pin 12c and a wall 12d. The first pin 12a, the second pin 12b and the third pin 12c are disposed on the wall 12d and in parallel to each other. The first pin 12a and the third pin 12c are located at a first height level and have the same length. The second pin 12b is disposed between the first pin 12a and the third pin 12c. The length of the second pin 12b is larger than that of the first pin 12a and the third pin 12c. Further, the second pin 12b is located at another height level higher than that of the first pin 12a and the third pin 12c. Firstly, as shown in FIG. 7A, the driving unit 11 drives the dual printhead assembly 2 to move horizontally and be located nearby the first pin 12a, so that the free end of the rotating arm 61 is relative to the first pin 12a and the initial height level of the free end of the rotating arm 61 is higher than that of the first pin 12a. While the driving unit 11 drives the dual printhead assembly 2 to move along the direction from the first pin 12a to the second pin 12b, the free end of the rotating arm 61 is pressed against the first pin 12a and rotated to a height level higher than that of the second pin 12b. Afterward, as shown in FIG. 7B, the driving unit 11 drives the dual printhead assembly 2 to shift horizontally along the direction parallel to the axis of the second pin 12b to make the rotating arm 61 disengaged from the first pin 12a, and then move horizontally along the direction from the second pin 12b to the third pin 12c. After the free end of the rotating arm 61 is driven to pass through the second pin 12b and disengaged from the third pin 12c, the free end of the rotating arm 61 is rotated to the finial height level between that of the second pin 12b and that of the third pin 12c. Consequently, the switching procedure is accomplished to switch the rotating arm 61 of the switching module 60 from the first position to the second position, as shown in FIG. 7C.

Figure 8A:
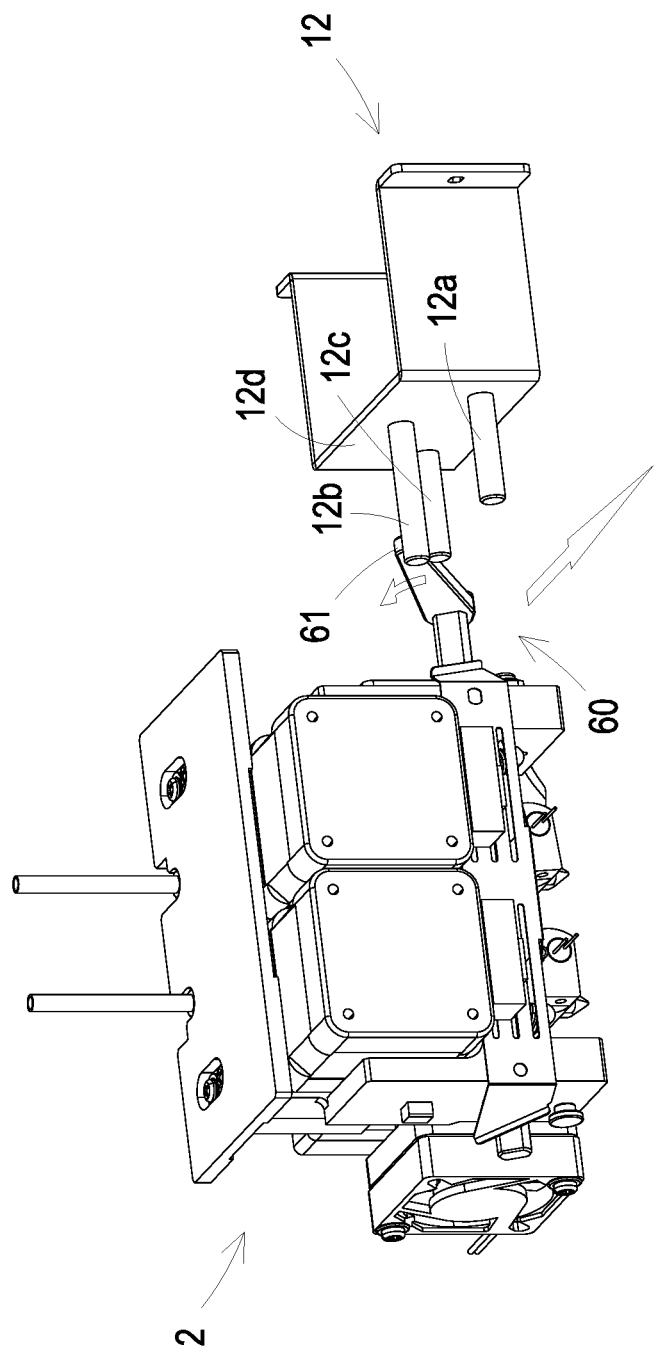
FIG. 8A illustrates the rotating arm of the switching module driven to switch from the second position to the first position at the first stage according to the first preferred embodiment of the present invention.
Figure 8B:
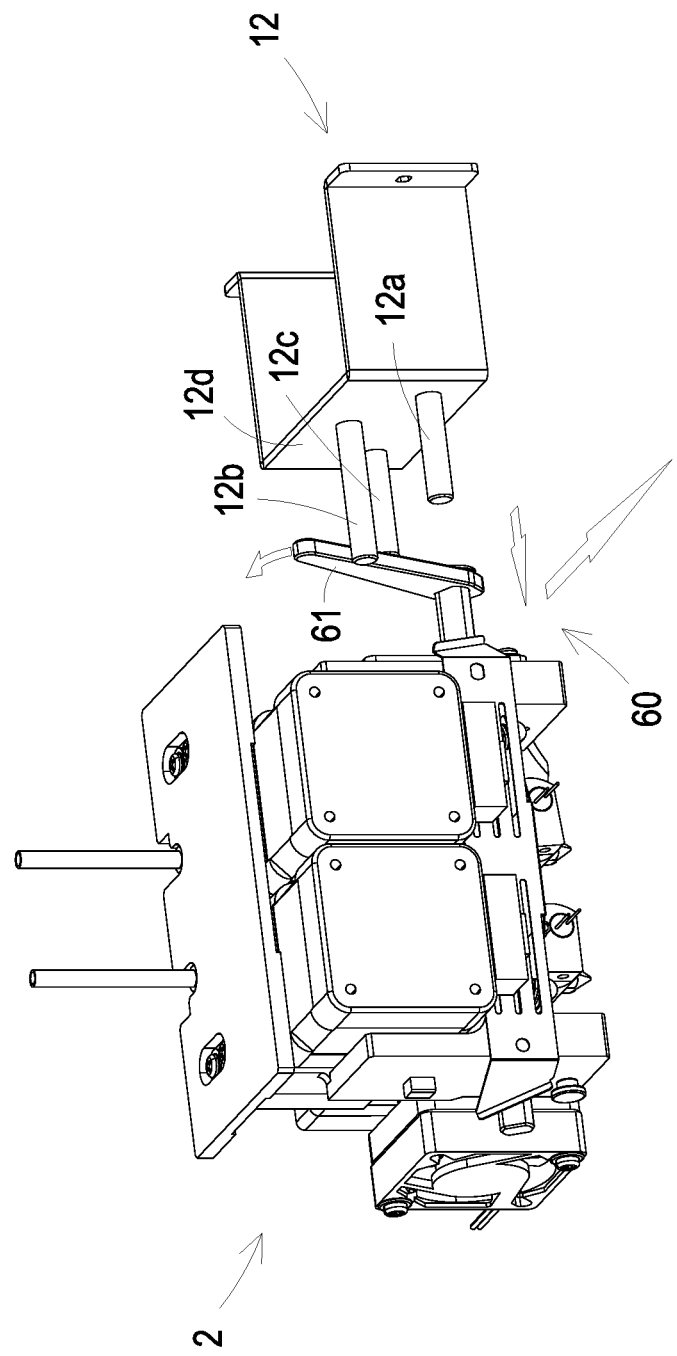
FIG. 8B illustrates the rotating arm of the switching module driven to switch from the second position to the first position at the second stage according to the first preferred embodiment of the present invention.
Figure 8C:
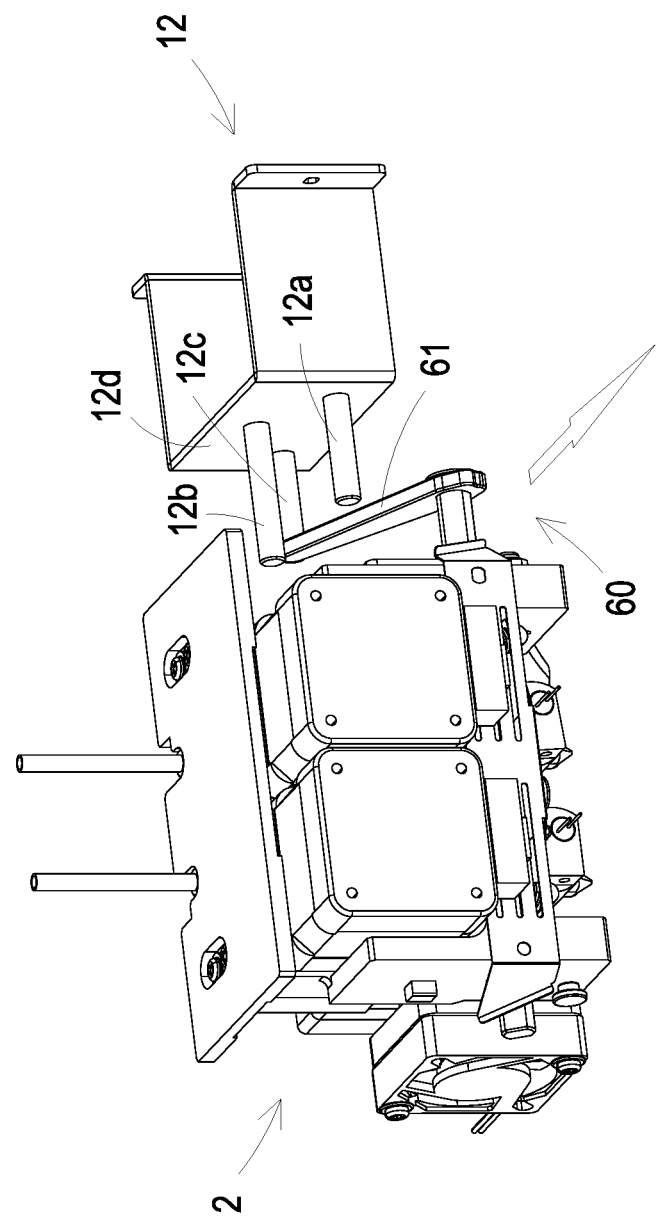
FIG. 8C illustrates the rotating arm of the switching module driven to switch from the second position to the first position at the third stage according to the first preferred embodiment of the present invention.

On the other hand, while the rotating arm 61 of the switching module 60 is switched from the second position to the first position, the driving unit 11 drives the dual printhead assembly 2 to move along a second horizontal displacement path relative to the switching pin set 12 and the position switching of the rotating arm 61 is accomplished. Namely, the executable status of the second printhead unit 42 in FIGS. 6A to 6C is switched to the executable status of the first printhead unit 41 in FIGS. 5A to 5C. FIG. 8A illustrates the rotating arm of the switching module driven to switch from the second position to the first position at the first stage according to the first preferred embodiment of the present invention. FIG. 8B illustrates the rotating arm of the switching module driven to switch from the second position to the first position at the second stage according to the first preferred embodiment of the present invention. FIG. 8C illustrates the rotating arm of the switching module driven to switch from the second position to the first position at the third stage according to the first preferred embodiment of the present invention. Firstly, as shown in FIG. 8A, the driving unit 11 drives the dual printhead assembly 2 to move horizontally and be located nearby the third pin 12c, so that the free end of the rotating arm is relative to the third pin 12c and the initial height level of the free end of the rotating arm 61 is higher than that of the third pin 12c. While the driving unit 11 drives the dual printhead assembly 2 to move along the direction from the third pin 12c to the second pin 12b, the free end of the rotating arm 61 is pressed against the third pin 12c and rotated to a height level higher than that of the second pin 12b. Afterward, as shown in FIG. 8B, the driving unit 11 drives the dual printhead assembly 2 to shift horizontally along the direction parallel to the axis of the second pin 12b to make the rotating arm 61 disengaged from the third pin 12c and then move horizontally along the direction from the second pin 12b to the first pin 12a. After the free end of the rotating arm 61 is driven to pass through the second pin 12b and disengaged from the first pin 12a, the free end of the rotating arm 61 is rotated to the finial height level between that of the second pin 12b and that of the first pin 12a. Consequently, the switching procedure is accomplished to switch the rotating arm 61 of the switching module 60 from the second position to the first position, as shown in FIG. 8C.

It is noted that regardless of whether the printhead module 40 is in the executable status of the first printhead unit 41 or the executable status of the second printhead unit 42, it is ensured that the printhead module 40 is in the executable status of the second printhead unit 42 after the printhead module 40 is driven to move along the first horizontal displacement path and in the executable status of the first printhead unit 41 after the printhead module 40 is driven to move along the second horizontal displacement path. Thus, regardless of whether the printhead module 40 employed to execute the previous final printing process is in the executable status of the first printhead unit 41 or the second printhead unit 42, for executing the next initial printing process, the printhead module 40 can be switched to the executable status of the first printhead unit 41 absolutely by driving the dual printhead assembly 2 to execute the movement of the second horizontal displacement path.

Figure 9:
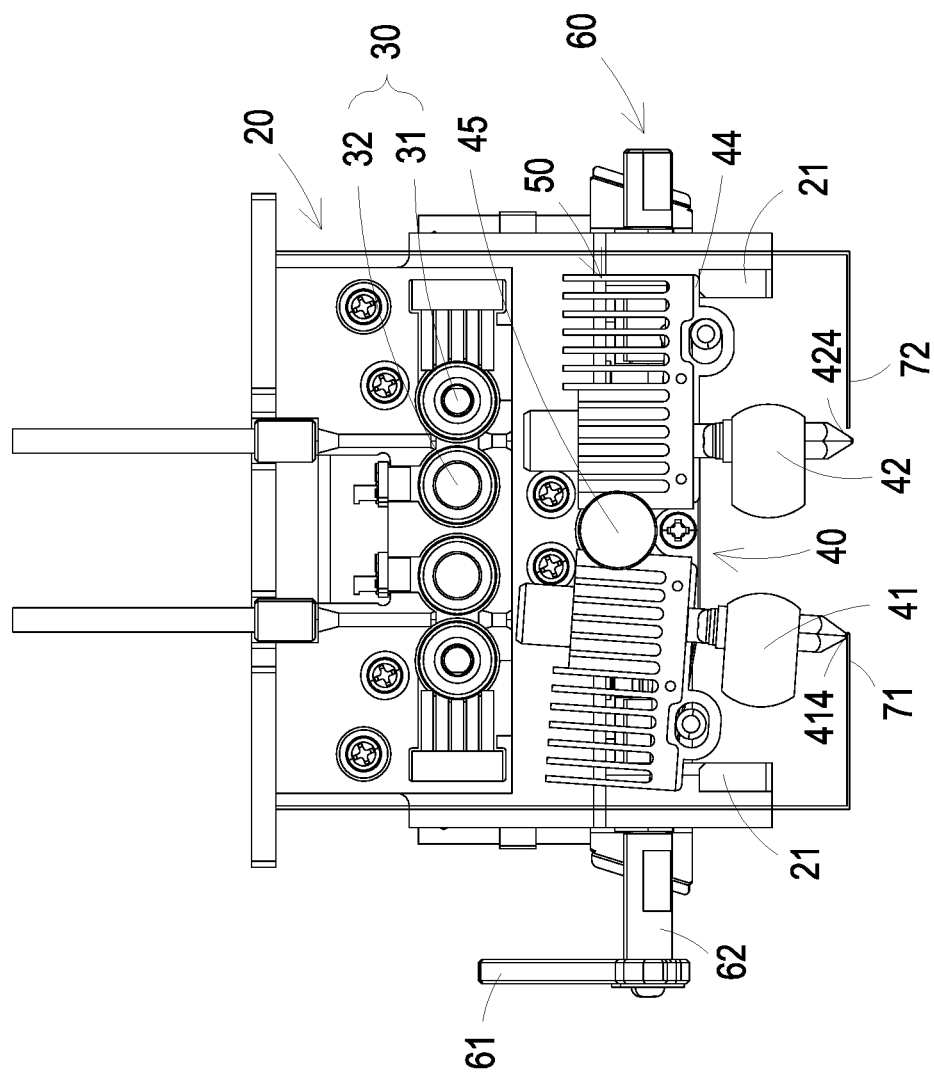
FIG. 9 is a front view illustrating a dual printhead assembly according to a second embodiment of the present invention.

FIG. 9 is a front view illustrating a dual printhead assembly according to a second embodiment of the present invention. In the embodiment, the structures, elements and functions of the dual printhead assembly 2a are similar to those of the dual printhead assembly 2 in FIGS. 2 and 3, and are not redundantly described herein. In the embodiment, the dual printhead assembly 2a further includes a first seal element 71 and a second seal element 72. Preferably but not exclusively, the first seal element 71 and the second seal element 72 are two elastic arms relative to the first printhead unit 41 and the second printhead unit 42, respectively, and constructed on two laterals of the base 20, respectively. The first seal element 71 includes an end located nearby the nozzle 414 of the first printhead unit and the second seal element 72 includes an end located nearby the nozzle 424 of the second printhead unit 42, so as to push against the nozzle 414 of the first printhead unit 41 or the nozzle 424 of the second printhead unit 42 in a non-use status according to the switching of the printhead module 40. In an embodiment, for example, while the second printhead unit 42 is in the executable status and the first printhead unit 41 in the non-use status is inclined by the switching module 60, the height level of the nozzle 414 of the first printhead unit 42 is higher than the nozzle 424 of the second printhead unit 42 and the mutual height difference ΔH2 is generated, as shown in FIG. 6. In the embodiment, the nozzle 414 of the first printhead unit 41 is shifted to push against the end of the first seal element 71, so as to seal and block the nozzle 414 of the first printhead unit 41. Preferably but not exclusively, the end of the first seal element 71 is a holding region of an elastic arm and capable of pushing against, sealing and blocking the nozzle 414 of the first printhead unit 41 in the non-use status, so as to prevent the high-temperature molten materials in the nozzle 414 from overflowing due to the influence of gravity when the nozzle 414 is cooling down. The waste of the materials and the printing defects on the working piece can be avoided. Thus, while the switching process of the switching module 60 in the dual printhead assembly 2a is accomplished, the nozzle in use can be performed to print immediately, instead of stopping and waiting for completely cooling the materials in the non-use nozzle. Consequently, the waste of operating time can be reduced effectively, and the operational efficiency of the dual printhead assembly is improved. Similarly, while the first printhead unit 41 is in the executable status and the second printhead unit 42 in the non-use status is inclined, the nozzle 424 of the second printhead unit 42 is pushed against, sealed and blocked by the end of the first seal element 71. It is not redundantly described herein.

In summary, the present provides a dual printhead assembly and a 3D printing apparatus using the same. The dual printhead assembly has the advantages of simple structure and being assembled easily. The dual printhead assembly can be installed and replaced via a single bolt easily, and a mutual height difference of the dual printhead assembly can be adjusted by controlling the rotating cams to drive a positioning swing arm of the dual printhead assembly. Consequently, the assembling process is simplified effectively, the cost is saved and the operational efficiency is improved. Further, the positioning swing arm is swung to adjust the mutual height difference of the dual printhead assembly while the dual printhead assembly is moved automatically to control the status of the rotating cams for driving the positioning swing arm. There is no need to add an extra independent driving source for driving the rotating cams or a height sensing unit for detecting the height difference. Thus, the operation of the dual printhead assembly for switching the mutual height difference is simplified effectively and the operational efficiency is improved. While the rotating cams are controlled to drive the positioning swing arm of the dual printhead assembly for adjusting the mutual height difference thereof, the non-use nozzle of the dual printhead assembly can be switched to press against an elastic arm so as to avoid overflowing of the cooling materials therein, wasting the raw materials and causing defects on the working piece. In addition, the nozzle in use can be performed to print continuously, instead of stopping and waiting for completely cooling the materials in the non-use nozzle. The waste of operating time can be reduced effectively, and the operational efficiency of the dual printhead assembly is improved. In addition, the dual nozzle assembly is driven to move relative to a switch pin set by the driving unit of the 3D printing apparatus so that the dual printhead assembly can accomplish the nozzle switching operation of the dual printhead assembly without using additional driving sources. Not only the cost is saved, but also the operational efficiency of the dual printhead assembly and the 3D printing apparatus is improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A dual printhead assembly, comprising:
    a base;
    a printhead module comprising a first printhead unit, a second printhead unit, a bearing, a positioning swing arm and a fixing piece, wherein the bearing is disposed at a middle portion of the positioning swing arm, the first printhead unit and the second printhead unit are disposed on the positioning swing arm and relative to two opposite edges of the bearing, respectively, and the printhead module is fixed to the base by the fixing piece passing through the bearing, wherein the positioning swing arm comprises a first connection element and a second connection element disposed on two ends of the positioning swing arm and located nearby the first printhead unit and the second printhead unit, respectively; and
    a switching module comprising a rotation shaft, a first cam, a second cam, an elastic sheet, a third connection element and a fourth connection element, wherein the elastic sheet is fixed to the base, the third connection element and the fourth connection element are disposed on a first end and a second end of the elastic sheet, respectively, wherein the third connection element is connected to the first connection element and the fourth connection element is connected to the second connection element, wherein the rotation shaft is pivotally connected with the base, and the first cam and the second cam are disposed coaxially on two ends of the rotation shaft and relative to the third connection element and the fourth connection element on the elastic sheet, respectively, wherein while the rotation shaft is rotated to a first position, the second cam is disengaged from the elastic sheet and the first cam presses the first end of the elastic sheet to drive the third connection element to press the first connection element, wherein while the rotation shaft is rotated to a second position, the first cam is disengaged from the elastic sheet and the second cam presses the second end of the elastic sheet to drive the fourth connection element to press the second connection element, so that the positioning swing arm pivoted via the bearing is swung to adjust a mutual height difference between the first printhead unit and the second printhead unit.

2. The dual printhead assembly according to claim 1, wherein the switching module comprises a rotating arm connected to an end of the rotation shaft and configured to switch the rotation shaft between the first position and the second position.

3. The dual printhead assembly according to claim 1, further comprising a heat dissipation module, wherein the heat dissipation module comprises a first heat sink and a second heat sink disposed on the positioning swing arm and located nearby the two opposite edges of the bearing, respectively, wherein the first printhead unit passes through the first heat sink and the second printhead unit passes through the second heat sink so that the first printhead unit and the second printhead unit are fixed on the positioning swing arm.

4. The dual printhead assembly according to claim 3, wherein the heat dissipation module comprises at least one cooling fan set disposed nearby a lateral side of the first printhead unit and the second printhead unit.

5. The dual printhead assembly according to claim 1, wherein each of the first printhead unit and the second printhead unit comprises a feeding port, a heating tube, a temperature sensor and a nozzle.

6. The dual printhead assembly according to claim 1, further comprising a feeding module disposed on one side of the base, wherein the feeding module comprises at least two sets of an active feeding wheel and a passive feeding wheel, wherein the at least two sets of the active feeding wheel and the passive feed are configured to feed printing materials toward a feeding port of the first printhead unit and a feeding port of the second printhead unit, respectively.

7. The dual printhead assembly according to claim 1, further comprising a first seal element and a second seal element disposed on the base, respectively, wherein the first seal element comprises an end relative to and located nearby a nozzle of the first printhead unit and the second seal element comprises an end relative to and located nearby a nozzle of the second printhead unit, wherein while the rotation shaft is rotated to the first position, the end of the second seal element blocks the nozzle of the second printhead unit, wherein while the rotation shaft is rotated to the second position, the end of the first seal element blocks the nozzle of the first printhead unit.

8. The dual printhead assembly according to claim 1, wherein the base comprises at least two stoppers disposed on two ends of the base and faced to the two ends of the positioning swing arm, respectively, so as to stop one of the two ends of the positioning swing arm swung to press thereat.

9. The dual printhead assembly according to claim 1, wherein the bearing is a ball baring and the fixing piece is a fixing bolt.

10. The dual printhead assembly according to claim 1, wherein the first connection element is a first positioning hole, the second connection element is a second positioning hole, the third connection element is a first positioning pin and the fourth connection element is a second positioning pin, wherein the first positioning pin is inserted into the first positioning hole and the second positioning pin is inserted into the second positioning hole.

11. A 3D printing apparatus comprising:
a frame;
a driving unit constructed on the frame;
a dual printhead assembly, constructed on the driving unit and driven by the driving unit for displacement on at least one plane, wherein the dual printhead assembly comprises:
 a base;
 a printhead module comprising a first printhead unit, a second printhead unit, a bearing, a positioning swing arm and a fixing piece, wherein the bearing is disposed at a middle portion of the positioning swing arm, the first printhead unit and the second printhead unit are disposed on the positioning swing arm and located at two opposite edges of the bearing, respectively, and the printhead module is fixed to the base by the fixing piece passing through the bearing, wherein the positioning swing arm comprises a first connection element and a second connection element disposed on two ends of the positioning swing arm and located nearby the first printhead unit and the second printhead unit, respectively; and
 a switching module comprising a rotation shaft, a rotating arm, a first cam, a second cam, an elastic sheet, a third connection element, and a fourth connection element, wherein the elastic sheet is fixed to the base, the third connection element and the fourth connection element are disposed on a first end and a second end of the elastic sheet, respectively, the third connection element is connected to the first connection element and the fourth connection element is connected to the second connection element, wherein the rotation shaft is pivotally connected with the base, the rotating arm is connected to an end of the rotation shaft and the first cam and the second cam are disposed coaxially on two ends of the rotation shaft and relative to the third connection element and the fourth connection element on the elastic sheet, respectively, wherein while the rotation shaft is rotated to a first position, the second cam is disengaged from the elastic sheet and the first cam presses the first end of the elastic sheet to drive the third connection element to press the first connection element, wherein while the rotation shaft is rotated to a second position, the first cam is disengaged from the elastic sheet and the second cam presses the second end of the elastic sheet to drive the fourth connection element to press the second connection element, so that the positioning swing arm pivoted via the bearing is swung to adjust a mutual height difference between the first printhead unit and the second printhead unit; and
a switching pin set disposed on an edge of the frame, wherein while the dual printhead assembly is driven by the driving unit to move along a first path, the rotating arm is pushed against by the switching pin set and the rotation shaft is rotated to the first position, wherein while the dual printhead assembly is driven by the driving unit to move along a second path, the rotating arm is pushed against by the switching pin set and the rotation shaft is rotated to the second position.

12. The 3D printing apparatus according to claim 11, wherein the switching pin set comprises a first pin, a second pin, a third pin and a wall, wherein the first pin, the second pin and the third pin are disposed on the wall and in parallel to each other, the first pin and the third pin are located at a first height level and have a first length, the second pin is disposed between the first pin and the third pin and has a second length larger than the first length, and the second pin is located at a second height level higher than the first height level.

13. The 3D printing apparatus according to claim 11, wherein the dual printhead assembly further comprises a heat dissipation module, wherein the heat dissipation module comprises a first heat sink and a second heat sink disposed on the positioning swing arm and located nearby the two opposite edges of the bearing, respectively, wherein the first printhead unit passes through the first heat sink and the second printhead unit passes through the second heat sink so that the first printhead unit and the second printhead unit are fixed on the positioning swing arm.

14. The 3D printing apparatus according to claim 13, wherein the heat dissipation module comprises at least one cooling fan set disposed nearby a lateral side of the first printhead unit and the second printhead unit.

15. The 3D printing apparatus according to claim 11, wherein each of the first printhead unit and the second printhead unit comprises a feeding port, a heating tube, a temperature sensor and a nozzle.

16. The 3D printing apparatus according to claim 11, wherein the dual printhead assembly comprises a feeding module disposed on one side of the base, wherein the feeding module comprises at least two sets of an active feeding wheel and a passive feeding wheel wherein the at least two sets of the active feeding wheel and the passive feed are configured to feed printing materials toward a feeding port of the first printhead unit and a feeding port of the second printhead unit, respectively.

17. The 3D printing apparatus according to claim 11, wherein the dual printhead assembly comprises a first seal element and a second seal element disposed on the base, respectively, wherein the first seal element comprises an end relative to and located nearby a nozzle of the first printhead unit and the second seal element comprises an end relative to and located nearby a nozzle of the second printhead unit, wherein while the rotation shaft is rotated to the first position, the end of the second seal element blocks the nozzle of the second printhead unit, wherein while the rotation shaft is rotated to the second position, the end of the first seal element blocks the nozzle of the first printhead unit.

18. The 3D printing apparatus according to claim 11, wherein the base comprises at least two stoppers disposed on two ends of the base and faced to the two ends of the positioning swing arm, respectively, so as to stop one of the two ends of the positioning swing arm swung to press thereat.

19. The 3D printing apparatus according to claim 11, wherein the bearing is a ball baring and the fixing piece is a fixing bolt.

20. The 3D printing apparatus according to claim 11, wherein the first connection element is a first positioning hole, the second connection element is a second positioning hole, the third connection element is a first positioning pin and the fourth connection element is a second positioning pin, wherein the first positioning pin is inserted into the first positioning hole and the second positioning pin is inserted into the second positioning hole.

* * * * *